US012646960B2

(12) United States Patent
Wang et al.

(10) Patent No.: US 12,646,960 B2
(45) Date of Patent: Jun. 2, 2026

(54) VOLTAGE COMPENSATION METHOD USING CURRENT AND RESISTANCE VALUES OF CONDUCTIVE LINE

(71) Applicant: Beijing Zitiao Network Technology Co., Ltd., Beijing (CN)

(72) Inventors: Qi Wang, Beijing (CN); Rentao Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 223 days.

(21) Appl. No.: 18/525,090

(22) Filed: Nov. 30, 2023

(65) Prior Publication Data

US 2024/0195202 A1 Jun. 13, 2024

(30) Foreign Application Priority Data

Dec. 9, 2022 (CN) .......................... 202211583367.1

(51) Int. Cl.
| | |
|---|---|
| *G06F 1/26* | (2006.01) |
| *H02J 7/80* | (2026.01) |
| *H02J 7/90* | (2026.01) |

(52) U.S. Cl.
CPC ................ *H02J 7/933* (2026.01); *G06F 1/26* (2013.01); *H02J 7/80* (2026.01)

(58) Field of Classification Search
None
See application file for complete search history.

(56) References Cited

U.S. PATENT DOCUMENTS

| | | | | |
|---|---|---|---|---|
| 9,874,927 B2 * | 1/2018 | Vogman | .................... | G06F 1/28 |
| 2007/0028130 A1 * | 2/2007 | Schumacher | ......... | G06F 1/3215 |
| | | | | 713/320 |
| 2014/0189376 A1 * | 7/2014 | Rotem | .................. | G06F 1/3296 |
| | | | | 713/300 |
| 2015/0058653 A1 * | 2/2015 | Blayvas | ................ | G06F 1/3206 |
| | | | | 713/340 |
| 2016/0233692 A1 * | 8/2016 | Hwang | .................. | H02J 7/0031 |
| 2019/0265767 A1 * | 8/2019 | Mehra | ..................... | G06F 1/324 |
| 2023/0178979 A1 * | 6/2023 | Ciesluk | .................... | G06F 1/305 |
| | | | | 361/91.1 |

* cited by examiner

*Primary Examiner* — Danny Chan
(74) *Attorney, Agent, or Firm* — Alleman Hall LLP

(57) ABSTRACT

Embodiments of the present disclosure provide a voltage compensation method, an apparatus, storage medium, and a program product. Voltage values at both ends of a conductive line between a power supply apparatus and a processing apparatus, and a current value on the conductive line are determined; a current resistance value of the conductive line is determined according to the voltage values at both ends of the conductive line and the current value; and a compensation is performed on a shutdown voltage value and/or a charging voltage value of the processing apparatus according to the current resistance value and the current value of the conductive line. As such, the shutdown voltage value and/or the charging voltage value of the power supply apparatus side can be ensured to remain constant, effectively protecting the power supply apparatus and the processing apparatus, and ensuring the use experience of the terminal device.

17 Claims, 3 Drawing Sheets

Determining a current resistance value of a conductive line, and a current value on the conductive line, and performing a compensation on a shutdown voltage value and/or a charging voltage value of the processing apparatus Conductive Line Processing Apparatus Power Supply Apparatus

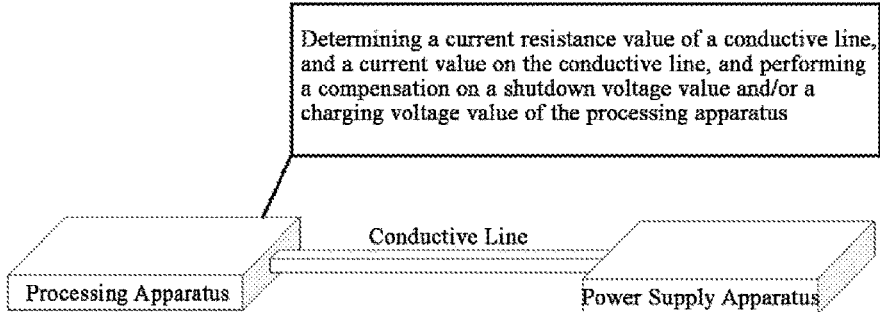

Determining a current resistance value of a conductive line, and a current value on the conductive line, and performing a compensation on a shutdown voltage value and/or a charging voltage value of the processing apparatus Conductive Line Processing Apparatus Power Supply Apparatus

FIG. 1

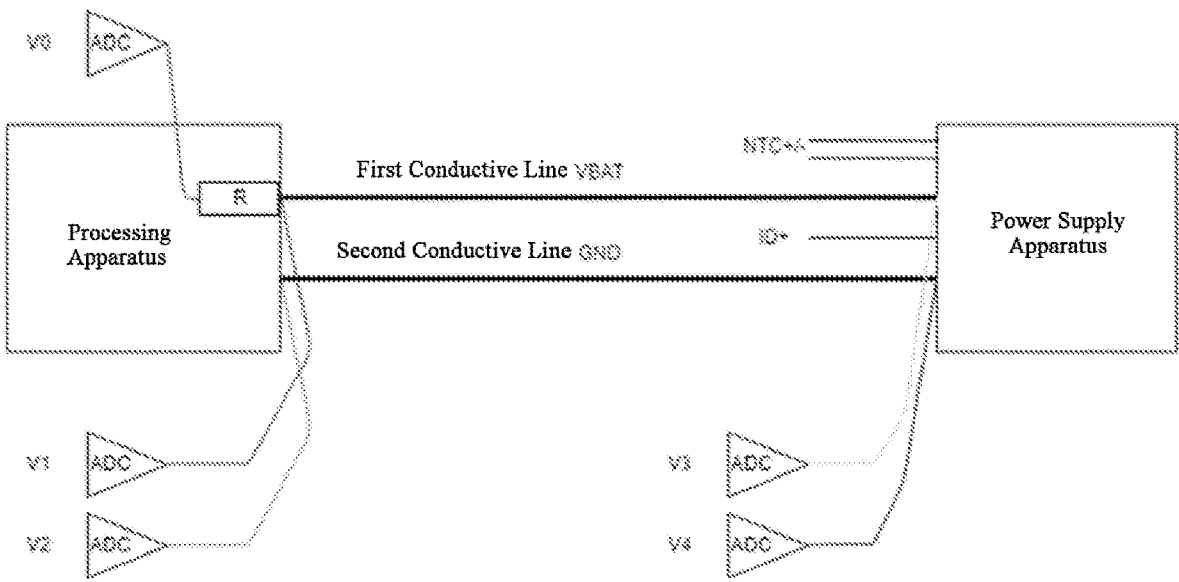

V0   ADC

Processing
Apparatus

R

First Conductive Line VBAT

Second Conductive Line GND

NTC+A

ID+

Power Supply
Apparatus

V1   ADC

V2   ADC

V3   ADC

V4   ADC

FIG. 2

VOLTAGE COMPENSATION METHOD USING CURRENT AND RESISTANCE VALUES OF CONDUCTIVE LINE

CROSS-REFERENCE TO RELATED APPLICATION(S)

This application claims priority to Chinese Application No. 202211583367.1 filed on Dec. 9, 2022, the disclosure of which is incorporated herein by reference in its entity.

FIELD

Embodiments of the present disclosure relate to the technical field of computer and network communications, and in particular to a voltage compensation method, a device, a storage medium, and a program product.

BACKGROUND

In some terminal devices, a processing apparatus and a power supply apparatus are far apart, and the processing apparatus and the power supply apparatus need to be connected by a long conductive line. For example, for a VR device, the processing apparatus is placed on the front side of the human eyes and the power supply apparatus is placed on the back side of the brain, in which the power supply apparatus needs to charge the processing apparatus through a very long conductive line.

However, there may be a large impedance on the conductive line due to possible assembly tolerances, or the conductive line may be mutated and the impedance may increase during use due to repeated bending and pulling, etc., which may cause anomalies or damages to the power supply apparatus and/or the processing apparatus during charging and discharging of the power supply apparatus, or affect the use of the terminal device.

SUMMARY

An embodiment of the present disclosure provides a voltage compensation method, an apparatus, a storage medium, and a program product, thereby monitoring a current resistance value of a conductive line between a processing apparatus and a power supply apparatus, to perform a dynamic compensation according to the current resistance value of the conductive line so as to protect the power supply apparatus and the processing apparatus, thereby ensuring the use experience of a terminal device.

In a first aspect, an embodiment of the present disclosure provides an electronic device, including a power supply apparatus, a processing apparatus, a conductive line, a measuring resistance, and voltage sensors, wherein: the power supply apparatus and the processing apparatus are connected through the conductive line; the measurement resistor is arranged on the processing apparatus and is connected in series with the processing apparatus and the power supply apparatus; the voltage sensors are arranged at both ends of the conductive line and at both ends of the measurement resistor for measuring voltage values at both ends of the conductive line, and voltage values at both ends of the measurement resistor, and transmitting the voltage values to the processing apparatus.

In a second aspect, an embodiment of the present disclosure provides a voltage compensation method, applied to the electronic device as described in the first aspect, which includes: determining voltage values at both ends of a conductive line, and a current value on the conductive line; determining a current resistance value of the conductive line, according to the voltage values at both ends of the conductive line, and the current value; and performing a compensation on a shutdown voltage value and/or a charging voltage value of the processing apparatus, according to the current resistance value and the current value of the conductive line.

In a third aspect, an embodiment of the present disclosure provides a voltage compensation device, including: a detection unit for determining voltage values at both ends of a conductive line, and a current value on the conductive line; a processing unit for determining a current resistance value of the conductive line according to the voltage values at both ends of the conductive line and the current value; and a compensation unit for performing a compensation on a shutdown voltage value and/or a charging voltage value of the processing unit according to the current resistance value and the current value of the conductive line.

In a fourth aspect, an embodiment of the present disclosure provides a processing apparatus, including at least one processor and a memory, wherein: the memory stores computer-executable instructions; and the at least one processor executes the computer-executable instructions stored on the memory, such that the at least one processor performs the voltage compensation method as described in the second aspect above and in various possible designs of the second aspect.

In a fifth aspect, an embodiment of the present disclosure provides a computer-readable storage medium having computer-executable instructions stored thereon which, when executed by a processor, implement the voltage compensation methods as described in the second aspect above and in the various possible designs of the second aspect.

In a sixth aspect, an embodiment of the present disclosure provides a computer program product including computer-executable instructions which, when executed by a processor, implement the voltage compensation methods as described in the second aspect above as well as in various possible designs of the second aspect.

In a voltage compensation method, an apparatus, a storage medium, and a program product provided by embodiments of the present disclosure, in which voltage values at both ends of a conductive line between a power supply apparatus and a processing apparatus, and a current value on the conductive line are determined; a current resistance value of the conductive line is determined according to the voltage values at both ends of the conductive line and the current value; and a compensation is performed on a shutdown voltage value and/or a charging voltage value of the processing apparatus according to the current resistance value and the current value of the conductive line. A dynamical compensation is performed on the shutdown voltage value and/or the charging voltage value of the processing apparatus based on the current resistance value and the current value of the conductive line, so that the shutdown voltage value and/or the charging voltage value of the power supply apparatus side can be ensured to remain constant, effectively protecting the power supply apparatus and the processing apparatus, and ensuring the use experience of the terminal device.

BRIEF DESCRIPTION OF THE DRAWINGS

In order to describe technical solutions in the embodiments of the present disclosure more clearly, the drawings needed to be used in the description about the embodiments or prior arts will be simply introduced below, and apparently, the drawings in the following description are some embodiments of the present disclosure. For those skilled in the art, other drawings may be obtained according to these drawings without paying any inventive effort.

FIG. 1 is a schematic diagram of a scenario of a voltage compensation method provided by an embodiment of the present disclosure.

FIG. 2 is a schematic diagram of a circuit provided by an embodiment of the present disclosure.

DETAILED DESCRIPTION OF EMBODIMENTS

Figure 3:
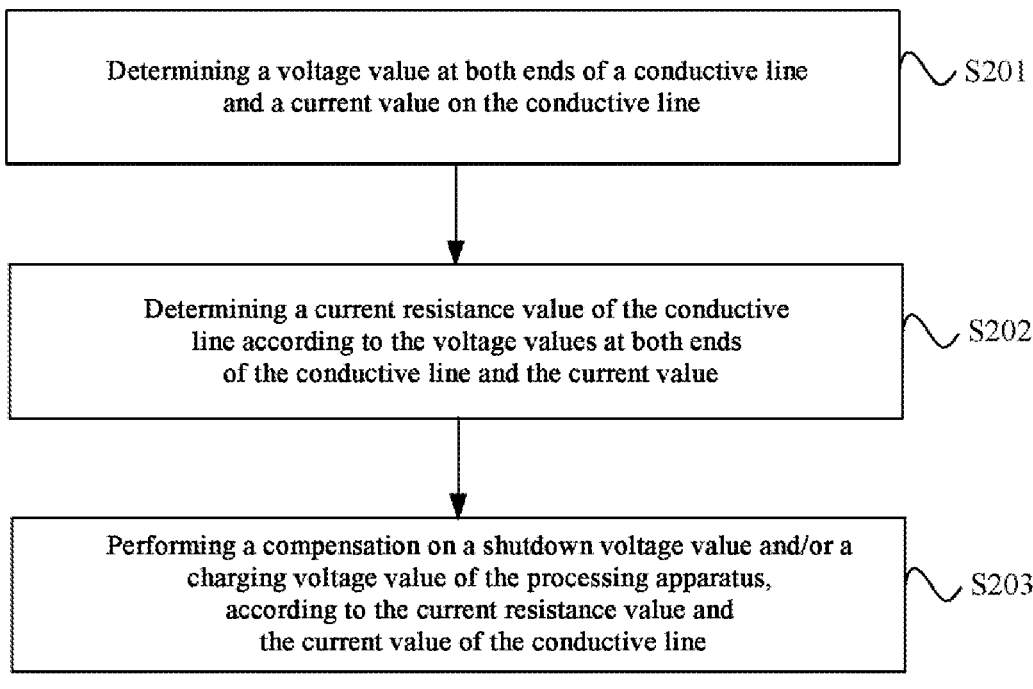
FIG. 3 is a schematic flowchart of a voltage compensation method provided by an embodiment of the present disclosure.

In order to make objectives, technical solutions and advantages of the embodiments of the present disclosure more clear, the technical solutions of the embodiments of the present disclosure will be clearly and completely described below with reference to the drawings of the embodiments of the present disclosure, and apparently, the described embodiments are a part of the embodiments of the present disclosure, not all of the embodiments. Based on the embodiments of the present disclosure, all other embodiments obtained by a person of ordinary skill in the art without paying any inventive effort are within the scope of protection of the present disclosure.

In some terminal devices, a processing apparatus and a power supply apparatus are far apart, and the processing apparatus and the power supply apparatus need to be connected by a long conductive line. For example, for a VR device, the processing apparatus is placed on the front side of the human eyes and the power supply apparatus is placed on the back side of the brain, in which the power supply apparatus needs to charge the processing apparatus through a very long conductive line.

However, there may be a large impedance on the conductive line due to possible assembly tolerances, or the conductive line may be mutated and the impedance may increase during use due to repeated bending and pulling, etc., which may cause anomalies or damages to the power supply apparatus and/or the processing apparatus during charging and discharging of the power supply apparatus, or affect the use of the terminal device.

For example, in order to protect the power supply apparatus during a discharge process, a fixed shutdown voltage is usually set at the processing apparatus side, and the processing apparatus side will control the terminal device to shut down after detecting that a voltage provided to the processing apparatus by the power supply apparatus is lower than a preset shutdown voltage. However, due to the existence of a voltage drop in the conductive line and the voltage drop in the conductive line also becoming greater with a resistance value of the conductive line becoming greater, when the processing apparatus side detects that the voltage provided to the processing apparatus by the power supply apparatus is lower than the preset shutdown voltage at, the voltage at the power supply apparatus side may still be relatively high, which has not yet been reduced to the shutdown voltage of the power supply apparatus, resulting in premature shutdown and shortening the endurance time of the terminal device.

In a charging process, during constant voltage charging, the charging device is controlled to output a constant voltage through the processing apparatus side. However, due to an existence of a voltage drop in the conductive line and the voltage drop in the conductive line also becoming greater with a resistance value of the conductive line becoming greater, the voltage received at the power supply apparatus side becomes less, resulting in the power supply apparatus has an extremely long charging time or is unable to be charged normally.

In order to solve the above technical problem, the present disclosure provides a voltage compensation method, in which voltage values at both ends of a conductive line between a power supply apparatus and a processing apparatus, and a current value on the conductive line are determined; a current resistance value of the conductive line is determined according to the voltage values at both ends of the conductive line and the current value; and a compensation is performed on a shutdown voltage value and/or a charging voltage value of the processing apparatus according to the current resistance value and the current value of the conductive line. Through performing a dynamical compensation on the shutdown voltage value and/or the charging voltage value of the processing apparatus according to the current resistance value and the current value of the conductive line, the shutdown voltage value and/or the charging voltage value of the power supply apparatus side can be ensured to remain constant, and the power supply apparatus and the processing apparatus are effectively protected, ensuring the use experience of the terminal device.

An application of the voltage compensation method and an electronic device provided by embodiments of the present disclosure are shown in FIG. 1. The electronic device includes a processing apparatus, and a power supply apparatus, wherein the processing apparatus and the power supply apparatus are connected by a long conductive line. Voltage values at both ends of the conductive line, and a current value on the conductive line can be determined by detection, and for a current resistance value and a current value of the conductive line, a compensation can be performed on a shutdown voltage value and/or a charging voltage value of the processing apparatus.

More specifically, the electronic device, as shown in FIG. 2, further includes a measurement resistor R and voltage sensors, wherein the measurement resistor R is arranged on the processing apparatus and connected in series with the processing apparatus and the power supply apparatus; and the voltage sensors are arranged at both ends of the conductive line and at both ends of the measurement resistor R for measuring voltage values at both ends of the conductive line, and voltage values at both ends of the measurement resistor R, and transmitting the voltage values to the processing apparatus.

Optionally, the voltage sensor may be an ADC (Analog-to-Digital Converter), and ADCs are respectively arranged at both ends of the conductive line and at both ends of the measurement resistor R. A difference of the voltages collected by the ADCs at both ends of the conductive line is the voltage values at both ends of the conductive line, and a difference of the voltages collected by the ADCs at both ends of the measurement resistor R is the voltage values at both ends of the measurement resistor R.

Herein, the conductive line includes a first conductive line and a second conductive line. The first conductive line (VBAT) connects a positive electrode of the power supply apparatus and a supply power voltage terminal of the processing apparatus, and the second conductive line (GND) connects a negative electrode of the power supply apparatus and a grounding terminal of the processing apparatus. Accordingly, the ADCs are respectively arranged at both ends of the first conductive line, and a difference of the collected voltages is the voltage values at both ends of the first conductive line; and the ADCs are arranged at both ends of the second conductive line, and a difference of the collected voltages is the voltage values at both ends of the second conductive line.

Optionally, the first conductive line is connected to the measurement resistor R, which is connected to the supply power voltage terminal of the processing apparatus. In this way, an end connected to the first conductive line of the measurement resistor R shares an ADC with the first conductive line, so it is only necessary to arrange another ADC at the end connected to the processing apparatus of the measurement resistor R. As such, only five ADCs are needed, in which voltages V0~V4 are detected by the five ADCs at the corresponding points respectively, so that the voltage at both ends of the first conductive line is V1-V3, the voltage at both ends of the second conductive line is V2-V4, and the measurement resistor R voltage is V0-V1.

The processing apparatus is further configured to, according to the voltage values at both ends of the conductive line, the voltage values at both ends of the measurement resistor, and the resistance value of the measurement resistor, determine a current value on the conductive line and a current resistance value of the conductive line, and according to the current value on the conductive line and the current resistance value of the conductive line, performing a compensation on the shutdown voltage value and/or the charging voltage value of the processing apparatus.

The voltage compensation method provided by the embodiment of the present disclosure will be described in detail below.

Referring to FIG. 3, FIG. 3 is a schematic flowchart of a voltage compensation method provided by the embodiment of the present disclosure. The method according to the present embodiment can be applied to the electronic device as shown in FIG. 1 and FIG. 2. The electronic device may be a wearable device or other electronic device, such as a VR device, in which the processing apparatus is placed on the front side of the human eyes, the power supply apparatus is placed on the back side of the brain, and the power supply apparatus needs to supply power to the processing apparatus via a very long conductive line.

An execution subject of the voltage compensation method according to the present embodiment is the processing apparatus (including at least one processor and a memory, which is executed by the processor) of the electronic device, and the method specifically may include the following operations.

At S201, voltage values at both ends of the conductive line, and a current value on the conductive line are determined.

In the present embodiment, a measurement resistor and voltage sensors are arranged in the electronic device, wherein the measurement resistor is connected in series with the processing apparatus and the power supply apparatus, whose resistance value is known, for example, may be 2 mohm, and the voltage sensors detect voltage values at both ends of the measurement resistor, such that a current value of the measurement resistor (i.e., which is equal to the current value of the conductive line) may be determined according to the voltage values at both ends of the measurement resistor and the resistance value of the measurement resistor.

In addition, voltage values at both ends of the conductive line may be detected through the voltage sensor detection.

At S202, according to the voltage values at both ends of the conductive line and the current value, a current resistance value of the conductive line is determined.

In the present embodiment, the voltage values at both ends of the conductive line and the current value on the conductive line are known, and the current resistance value of the conductive line may be determined.

Herein, the conductive line includes a first conductive line and a second conductive line, wherein the first conductive line connects a positive electrode of the power supply apparatus and a supply power voltage terminal of the processing apparatus, the second conductive line connects to a negative electrode of the power supply apparatus and a grounding terminal of the processing apparatus, and the current resistance value of the conductive line may include a current resistance value of the first conductive line and a current resistance value of the second conductive line. The voltage values across both ends of the first conductive line and the second conductive line may be detected through voltage sensor detection, respectively. Further, a current resistance value of the first conductive line may be determined according to the voltage value and current value at both ends of the first conductive line, and a current resistance value of the second conductive line may be determined according to the voltage value and current value at both ends of the second conductive line.

Taking the circuit schematic shown in FIG. 2 as an example, the current resistance value of the first conductive line R0=(V1-V3)/I, and the current resistance value of the second conductive line R1=(V2-V4)/I, wherein I=(V0-V1)/R.

At S203, a compensation is performed on the shutdown voltage value and/or the charging voltage value of the processing apparatus according to the current resistance value and the current value of the conductive line.

In the present embodiment, with the prolongation of the use time, the wire of the conductive line may be mutated, resulting in a gradual increase in the current resistance value of the conductive line, so in the charging and discharging process of the power supply apparatus, there will be a relatively large voltage drop on the conductive line. In a case where the shutdown voltage value and the charging voltage value of the processing apparatus side remain unchanged, it will result in a deviation of the shutdown voltage and/or the charging voltage at the power supply apparatus side. Thus, for the current resistance value of the conductive line, the compensation on the shutdown voltage value and/or the charging voltage value preset at the processing apparatus may be performed, thereby ensuring that the shutdown voltage and/or the charging voltage at the power supply apparatus side remain constant. That is, the terminal device is controlled to shut down upon the output voltage at the power supply apparatus side is lower than the constant shutdown voltage during discharging, so as to avoid premature shutdown when the output voltage at the power supply apparatus side has not yet been reduced to the shutdown voltage, which will lead to a shortening of the endurance time of the terminal device. During charging, a constant charging voltage is always charged at the power supply apparatus side, so as to avoid resulting in slow charging or inability to charge normally of the power supply apparatus due to a reduction in the charging voltage. The voltage compensation value in the present embodiment may be dynamically determined according to the current resistance value and the current value of the conductive line.

According to the voltage compensation method of the present embodiment, voltage values at both ends of the conductive line between the power supply apparatus and the processing apparatus, and a current value on the conductive line are determined; a current resistance value of the conductive line is determined according to the voltage values at both ends of the conductive line and the current value; and a compensation is performed on the shutdown voltage value and/or the charging voltage value of the processing apparatus according to the current resistance value and the current value of the conductive line. Through performing a dynamical compensation on the shutdown voltage value and/or the charging voltage value of the processing apparatus according to the current resistance value and the current value of the conductive line, the shutdown voltage value and/or the charging voltage value of the power supply apparatus side can be ensured to remain constant, effectively protecting the power supply apparatus and the processing apparatus, and ensuring the use experience of the terminal device.

On the basis of the above embodiment, performing the compensation on the shutdown voltage value and/or the charging voltage value of the processing apparatus according to the current resistance value and the current value of the conductive line, includes: determining a voltage compensation value according to the current resistance value and the current value of the conductive line; in the discharging stage, determining, as a target shutdown voltage value of the processing apparatus, a result of subtracting the voltage compensation value from a preset shutdown voltage value of the power supply apparatus; and/or in the charging stage, determining, as a target charging voltage value of the processing apparatus, a result of adding the voltage compensation value to the preset charging voltage value of the power supply apparatus.

In the present embodiment, since there is a voltage drop on the conductive line, a voltage compensation value may be determined according to the current resistance value and the current value of the conductive line. Optionally, the voltage drop existing on the conductive line is determined as the voltage compensation value, i.e., the product of the current resistance value and the current value of the conductive line is determined as the voltage compensation value. It should be noted that since the current resistance value of the conductive line includes a current resistance value of the first conductive line and a current resistance value of the second conductive line, the product of the current resistance value and the current value of the conductive line is herein determined as the voltage compensation value, i.e., a sum of the current resistance value of the first conductive line and the current resistance value of the second conductive line is multiplied by the current value, and the product is determined as the voltage compensation value.

In the discharging stage, a voltage at the processing apparatus side is lower than a voltage at the power supply apparatus side due to the existence of a voltage drop on the conductive line. In order to ensure that the shutdown voltage value of the power supply apparatus side remains constant at the preset shutdown voltage, the voltage drop of the conductive line is thus subtracted from the preset shutdown voltage value of the power supply apparatus, that is, the voltage compensation value is subtracted to obtain a target shutdown voltage value of the processing apparatus. That is, when the voltage at the processing apparatus side is reduced to the target shutdown voltage value, the voltage value of the power supply apparatus side is also reduced to the preset shutdown voltage value of the power supply apparatus side.

In the charging stage, due to the existence of a voltage drop on the conductive line, during constant voltage charging, in order to ensure that the charging voltage at the power supply apparatus side remains constant at the preset charging voltage value, the voltage drop of the conductive line is added to the preset charging voltage value of the power supply apparatus, i.e., the voltage compensation value is added to obtain a target charging voltage value of the processing apparatus. That is, only when the processing apparatus side reaches the target charging voltage value in the charging stage, the voltage at the power supply apparatus side reaches the preset charging voltage value of the power supply apparatus side.

Figure 4:
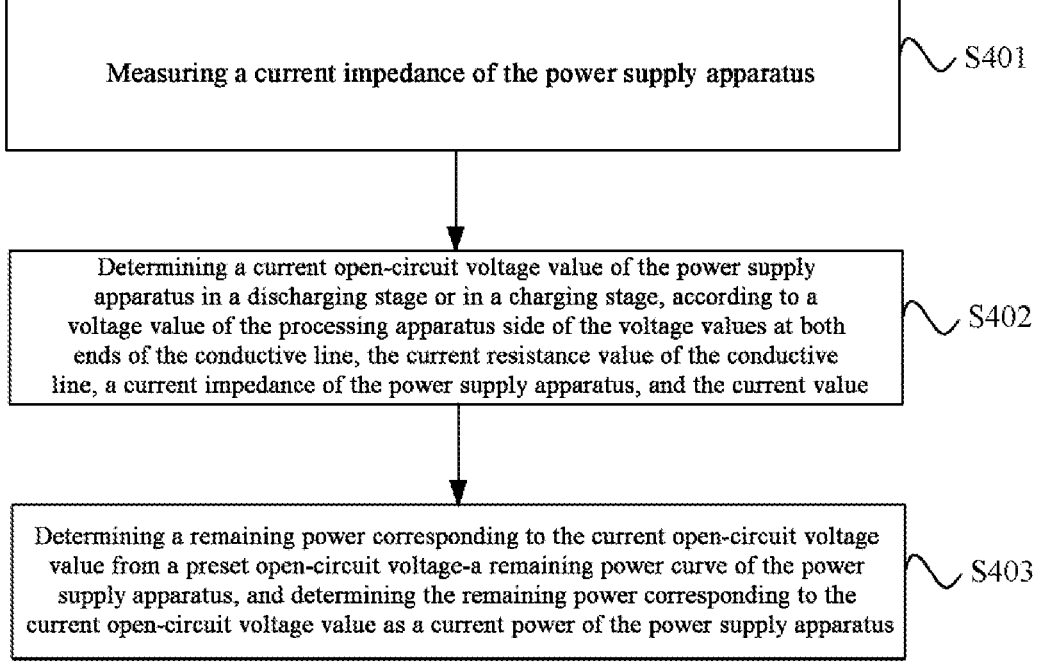
FIG. 4 is a schematic flowchart of a voltage compensation method provided by another embodiment of the present disclosure.

On the basis of the above embodiments, the present disclosure also provides a method of determining a remaining power of the power supply apparatus based on an accurate current resistance value of the conductive line, as shown in FIG. 4, and details are as follows: at S401, a current impedance of the power supply apparatus is measured; at S402, a current open-circuit voltage value of the power supply apparatus in the discharging stage or in the charging stage is determined according to the voltage value of the processing apparatus side of the voltage values at both ends of the conductive line, the current resistance value of the conductive line, the current impedance of the power supply apparatus, and the current value; and at S403, a remaining power corresponding to the current open-circuit voltage value is determined from a preset open-circuit voltage-remaining power curve of the power supply apparatus, and the remaining power corresponding to the current open-circuit voltage value is determined as the current power of the power supply apparatus.

In the present embodiment, since the impedance of the battery in the power supply apparatus may also be variable, it is also necessary to measure the current impedance of the power supply apparatus, wherein the current impedance of the power supply apparatus includes an ohmic impedance ESR and a polarization impedance ACR of the battery, and the current impedance of the power supply apparatus in the present embodiment is a sum of the ohmic impedance ESR and the polarization impedance ACR of the battery.

Since the voltage values at both ends of the conductive line have been measured in the above embodiment, the voltage value of the processing apparatus side thereof (i.e., the voltage at the end connected to the processing apparatus of the conductive line) is taken, and the current resistance value and the current value of the conductive line have been determined in the above embodiment. Based on this information, a current open-circuit voltage value (OCV) of the power supply apparatus in the discharging stage or the charging stage may be determined as follows:

$$\text{Discharging stage: } OCV = VADC + I(ESR + ACR + R0 + R1)$$

$$\text{Charging stage: } OCV = VADC - I(ESR + ACR + R0 + R1)$$

Herein, VADC is a voltage value of the processing apparatus side, I is a current value, ESR is an ohmic impedance of the battery, ACR is a polarization impedance of the battery, R0+R1 is a current resistance value of the conductive line, R0 is a current resistance value of the first conductive line in the conductive line, and R1 is a current resistance value of the second conductive line.

After the current open-circuit voltage value (OCV) of the power supply apparatus in the discharging stage or the charging stage is determined, based on a preset open-circuit voltage-remaining power curve (i.e., OCV-SOC curve) of the power supply apparatus, a remaining power (SOC) corresponding to the current open-circuit voltage value may be determined, and the remaining power (SOC) corresponding to the current open-circuit voltage value may be determined as a current power of the power supply apparatus.

Optionally, S401~S403 may be executed periodically, i.e., performed once every interval of time, and in the interval stage of each execution, the current power of the power supply apparatus may be updated by means of current integration, that is, the current value is integrated to obtain a power change value of the power supply apparatus in the discharging stage or in the charging stage:

$$CC = \int_0^T I \, dt$$

The current power of the power supply apparatus is then updated according to the power change value, i.e., the current power of the power supply apparatus in real time after the discharging stage S403 may be obtained by subtracting the power change value from the current power of the power supply apparatus determined by S403 in the discharging stage, and the current power of the power supply apparatus in real time after the charging stage S403 may be obtained by adding the power change value to the current power of the power supply apparatus determined by S403 in the charging stage.

On the basis of any of the above embodiments, since the cables of the conductive line gradually mutate with the prolongation of the use time, resulting in the resistance value of the conductive line gradually increasing, it is necessary to perform detection and warning on the resistance value of the conductive line. Details are as follows.

1. Factory Stage:

An initial resistance value of the conductive line may be monitored. When assembled in the factory, a cable impedance of the conductive line at the factory may be directly detected using the above process, and may be controlled within a specific initial impedance range. For example, the resistance values of the VBAT line and the GND line are distributed over 15 mohm~15+2 mohm, and the unqualified cables are repaired and replaced.

2. Impedance Using Stage:

In accordance with a determination that the current resistance value of the conductive line does not exceed a first preset threshold, for example, the resistance values of the VBAT line and the GND line are within a range of 15+15% mohm~15+20% mohm (the first preset threshold is 15+20% mohm), the above S203 is applied for performing a compensation for use.

3. Warn

In accordance with a determination that the current resistance value of the conductive line exceeds the first preset threshold, for example, at least one of the resistance values of the VBAT line and the GND line exceeds 15+20% mohm, warning information may be output to warn the user to carry out maintenance.

4. Discard:

In accordance with a determination that the current resistance value of the conductive line exceeds a second preset threshold value, for example, at least one of the resistance values of the VBAT line and the GND line exceeds 15+30% mohm, the charging and discharging currents of the power supply apparatus are limited to avoid the use of the original power resulting in the heating of the conductive line or other malfunctions, and maintenance prompting information is output.

5. Open-Circuit Detection:

In accordance with a determination that the current resistance value of the conductive line is a target multiple of the initial resistance value, for example, being "the total number of cables/the number of remaining cables" times of the initial resistance value, the number of disconnected cables of the conductive line may be determined according to the target multiple. For example, the VBAT is designed to have a parallel connection of 4 conductive lines, and in a case where 1 cable is disconnected during use, that is, the impedance becomes 4/3 of the initial resistance value, which means that there are only 3 cables left, with 1 cable disconnected. At this time, maintenance prompting information that includes the number of disconnected cables in the conductive line may be output to prompt the user to carry out maintenance.

Figure 5:
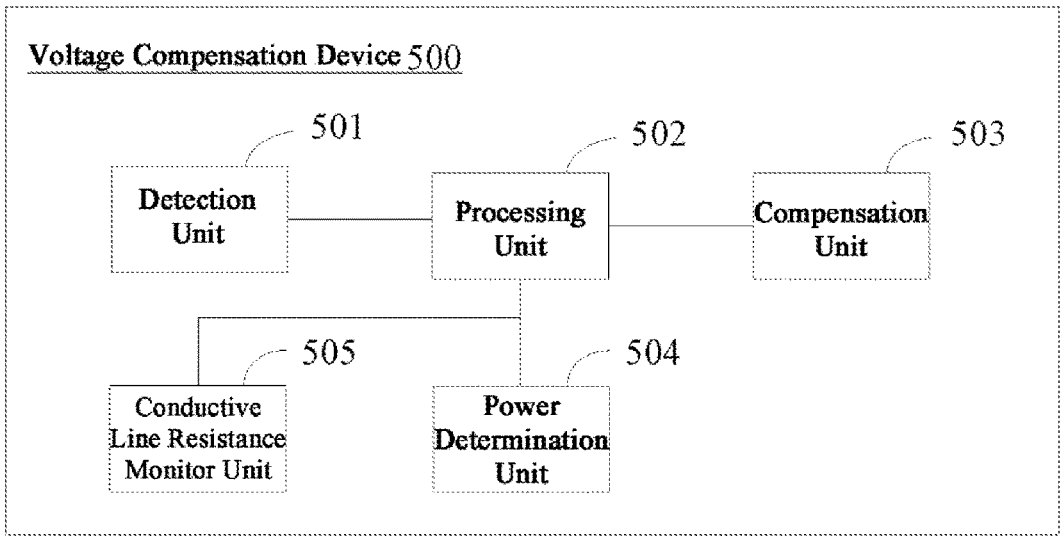
FIG. 5 is a block diagram of a structure of a voltage compensation device provided by an embodiment of the present disclosure.

Corresponding to the voltage compensation method of the above embodiment, FIG. 5 is a block diagram of a structure of a voltage compensation device provided by an embodiment of the present disclosure. For ease of illustration, only the portions relevant to the embodiments of the present disclosure are shown. Referring to FIG. 5, the voltage compensation device 500 includes: a detection unit 501, a processing unit 502, and a compensation unit 503.

The detection unit 501 is configured for determining voltage values at both ends of the conductive line, and a current value on the conductive line.

The processing unit 502 is configured for determining a current resistance value of the conductive line according to the voltage values at both ends of the conductive line and the current value.

The compensation unit 503 is configured for performing a compensation on a shutdown voltage value and/or a charging voltage value of a processing apparatus according to the current resistance value of the conductive line and the current value.

In one or more embodiments of the present disclosure, the compensation unit 503, in performing the compensation on the shutdown voltage value and/or the charging voltage value of the processing apparatus according to the current resistance value and the current value of the conductive line, is configured for: determining the voltage compensation value according to the current resistance value and the current value of the conductive line; in the discharging stage, determining, as the target shutdown voltage value of the processing apparatus, a result of subtracting the voltage compensation value from the preset shutdown voltage value of the power supply apparatus; and/or in the charging stage, determining, as the target charging voltage value of the processing apparatus, a result of adding the voltage compensation value to the preset charging voltage value of the power supply apparatus.

In one or more embodiments of the present disclosure, the compensation unit 503, in determining the voltage compensation value according to the current resistance value of the conductive line and the current value, is configured for: determining, as the voltage compensation value, a product of the current resistance value of the conductive line and the current value.

In one or more embodiments of the present disclosure, the conductive line includes a first conductive line and a second conductive line, and the current resistance value of the conductive line includes a current resistance value of the first conductive line and a current resistance value of the second conductive line, wherein the first conductive line connects a positive electrode of the power supply apparatus and a supply power voltage terminal of the processing apparatus, and the second conductive line connects a negative electrode of the power supply apparatus and a grounding terminal of the processing apparatus.

In one or more embodiments of the present disclosure, the detection unit 501, in determining the voltage values at both ends of a conductive line, is configured for: collecting, by voltage sensors, voltage values at both ends of the first conductive line and voltage values at both ends of the second conductive line.

The processing apparatus 502, in determining a current resistance value of the conductive line according to the voltage values at both ends of the conductive line and a current value, is configured for: determining a current resistance value of the first conductive line according to the voltage values at both ends of the first conductive line and the current value; and determining a current resistance value of the second conductive line according to the voltage values at both ends of the second conductive line and the current value.

In one or more embodiments of the present disclosure, the detection unit 501, in determining the current value on the conductive line, is configured for: collecting, by voltage sensors, voltage values at both ends of the measurement resistor; determining the current value on the conductive line according to the voltage values at both ends of the measurement resistor and the resistance value of the measurement resistor.

In one or more embodiments of the present disclosure, the detection unit 501 is further configured for, measuring a current impedance of the power supply apparatus; the processing apparatus 502 is further configured for, determining a current open-circuit voltage value of the power supply apparatus in the discharging stage or the charging stage, according to the voltage value of the processing apparatus side in the voltage values at both ends of the conductive line, the current resistance value of the conductive line, the current impedance of the power supply apparatus, and the current value; the device further includes a power determination unit 504 configured for determining a remaining power corresponding to the open-circuit voltage value from a preset open-circuit voltage-remaining power curve of the power supply apparatus, and determining a remaining power corresponding to the current open-circuit voltage value as a current power of the power supply apparatus.

In one or more embodiments of the present disclosure, the power determination unit 504, after determining the remaining power corresponding to the current open-circuit voltage as the current power of the power supply apparatus, is further configured for: integrating the current value to obtain a power change value of the power supply apparatus in the discharging stage or the charging stage; updating a current power of the power supply apparatus according to the power change value.

In one or more embodiments of the present disclosure, the device further includes a conductive line resistance monitor unit 505.

In a case where the conductive line resistance monitor unit 505 determines that the current resistance value of the conductive line has not exceeded a first preset threshold, the compensation unit 503 performs a compensation on the shutdown voltage and/or the charging voltage of the processing apparatus according to the current resistance value and the current value of the conductive line.

In one or more embodiments of the present disclosure, the conductive line resistance monitor unit 505 is further configured for: outputting warning information in accordance with a determination that the current resistance value of the conductive line exceeds a first preset threshold; and/or limiting a charging and discharging current of the power supply apparatus and outputting maintenance prompting information in accordance with a determination that the current resistance value of the conductive line exceeds a second preset threshold value, wherein the second preset threshold value is greater than the first preset threshold value; and/or determining the number of disconnected cables in the conductive lines according to a target time of the initial resistance value, and outputting maintenance prompting information in accordance with a determination that the current resistance value of the conductive line is the target time, wherein the maintenance prompting information includes the number of disconnected cables in the conductive line.

In one or more embodiments of the present disclosure, the electronic device is a wearable electronic device.

The device provided by the present embodiment may be configured for performing the technical solutions of the above method embodiments, with a similar implementation principle and an effect thereof, and thus will not be repeated here in the present embodiments.

Figure 6:
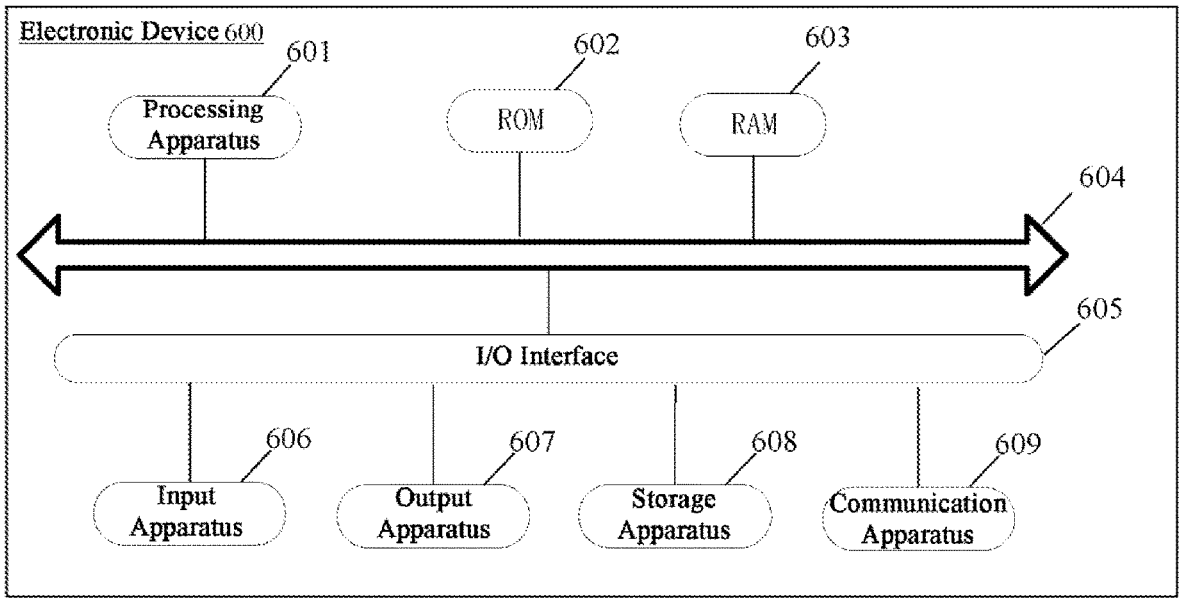
FIG. 6 is a schematic diagram of a hardware structure of an electronic device provided by an embodiment of the present disclosure.

Referring to FIG. 6, which illustrates a schematic diagram of a structure of an electronic device 600 suitable for achieving an embodiment of the present disclosure. The electronic device 600 may be a terminal device or a server, wherein the terminal device may include, but is not limited to, a mobile terminal such as a mobile phone, a smart phone, a notebook computer, a digital broadcast receiver, a Personal Digital Assistant (PDA for short), a tablet computer (PAD for short), a Portable Multimedia Player (PMP for short), or a vehicle-mounted terminal (for example, a vehicle-mounted navigator terminal) and so on, and a fixed terminal such as a digital TV or a desktop computer and so on. The electronic device illustrated in FIG. 6 is only an example, and should not bring any limitation to the functions and use scope of the embodiment of the present disclosure.

As shown in FIG. 6, the electronic device 600 may include a processing apparatus (e.g., a central processor, a graphics processor, etc.) 601 that may perform various appropriate actions and processing according to programs stored in Read Only Memory (ROM for short) 602 or programs loaded from a storage 608 into Random Access Memory (RAM for short) 603. Various programs and data necessary for the operation of the electronic device 600 are also stored in the RAM 603. The processing apparatus 601, the ROM 602, and the RAM 603 are connected to each other via a bus 604. Input/output (I/O) interface 605 is also connected to the bus 604.

Typically, the following apparatuses may be connected to the I/O interface 605, which may include an input apparatus 606 such as a touch screen, a touch pad, a keyboard, a mouse, a camera, a microphone, an accelerometer, a gyroscope and the like, include an output apparatus 607 such as a Liquid Crystal Display (LCD for short), a speaker, a vibrator and the like, include a storage apparatus 608 such as a tape, a hard disk and the like, and a communication apparatus 609, wherein the communication apparatus 609 may allow the electronic device 600 to communicate with other devices in a wireless or wired manner to exchange data. Although FIG. 6 illustrates electronic device 600 with various apparatuses, it should be understood that it is not required to implement or possess all of the illustrated devices. More or fewer devices may alternatively be implemented or possessed.

In particular, according to embodiments of the present disclosure, the process described above with reference to the flowchart may be implemented as computer software programs. For example, embodiments of the present disclosure include a computer program product including computer programs carried on a computer readable medium, which contains program code for performing the method shown in the flowchart. In such embodiments, the computer programs may be downloaded and installed from a network through the communication apparatus 609, or be installed from the storage apparatus 608, or be installed from the ROM 602. When the computer programs are executed by the processing apparatus 601, the above-described functions defined in the method of an embodiment of the present disclosure are performed.

It is to be noted that the storage medium of the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus or device, or a combination of any of the above. More specific examples of the computer-readable storage medium may include, but is not limited to, an electrical connector with one or more conductive lines, a portable computer disk, a hard disk, a Random Access Memory (RAM), a Read-Only Memory (ROM), an Erasable Programmable ROM (EPROM) (or a flash memory), an optical fiber, a portable Compact Disc Read-Only Memory (CD-ROM), an optical storage device, a magnetic storage device, or any proper combination thereof. In the present disclosure, the computer-readable storage medium may be any physical medium including or storing a program which may be used by or in combination with an instruction execution system, apparatus or device. In the present disclosure, the computer-readable signal medium may include a data signal in a baseband or propagated as a part of a carrier, with computer-readable program codes carried therein. Multiple forms may be used for the propagated data signal, including, but not limited to, an electromagnetic signal, an optical signal, or any proper combination. The computer-readable signal medium may be any computer readable medium other than a computer readable storage medium, which may transmit, propagate or send a program for use by or in connection with an instruction execution system, apparatus or device. The program codes contained in the computer-readable medium may be transmitted by any proper medium, including, but not limited to, an electric wire, an optical cable, Radio Frequency (RF), etc., or any proper combination thereof.

The above computer-readable medium may be included in the electronic device, or exist independently but is not assembled in the electronic device.

The above computer-readable medium carries one or more programs thereon, and when the above one or more programs are executed by the electronic device, the electronic device is caused to perform the method shown in the above embodiment.

The computer program codes used for executing operations in the present disclosure may be edited by one or more program design languages or combinations thereof. The program design language includes an object-oriented program design language such as Java, Smalltalk and C++, and also includes a conventional procedural program design language such as "C" language or a similar program design language. The computer codes may be completely executed in a user computer, partially executed in the user computer, executed as an independent software package, executed partially in the user computer and partially in a remote computer, or executed completely in the remote computer or a server. In a case involving a remote computer, the remote computer may be connected to the user computer through any type of network including a Local Area Network (LAN for short) or a Wide Area Network (WAN for short), or, may be connected to an external computer (e.g., connected by an Internet service provider through the Internet).

The flowcharts and block diagrams in the drawings illustrate probably-implemented system architectures, functions and operations of the system, method and computer program product according to embodiments of the present disclosure. In this regard, each block in the flowcharts or the block diagrams may represent a module, a program segment or part of codes, and the module, the program segment, or the part of codes includes one or more executable instructions used for achieving a specified logical function. It is also to be noted that, in some alternative implementations, the functions marked in the blocks may be implemented in an order different from those marked in the drawings. For example, two continuous blocks may actually be executed substantially concurrently, or may be executed in a reverse sequence sometimes, which is determined by the involved functions. It should also be noted that, each block in the block diagrams and/or the flowcharts and a combination of the blocks in the block diagrams and/or the flowcharts may be implemented by a dedicated hardware-based system used for executing a specified function or operation, or may be implemented by a combination of dedicated hardware and computer instructions.

The units involved in the embodiments of the present disclosure may be implemented by software or hardware, wherein a name of a unit does not form limitation on the unit in some cases, for example, the first acquisition unit may also be described as "a unit for acquiring at least two Internet Protocol addresses".

The above functions herein may be at least partially executed by one or more hardware logic components. Exemplarily but unrestrictedly, examples of the hardware logic component may include a Field-Programmable Gate Array (FPGA), an Application Specific Integrated Circuit (ASIC), an Application Specific Standard Product (ASSP), a System On Chip (SOC), a Complex Programmable Logic Device (CPLD), etc.

In the context of the present disclosure, the machine-readable medium may be a physical medium, and may include or store a program used by or in combination with an instruction execution system, apparatus or device. The machine-readable medium may include, but is not limited to, an electronic, magnetic, optical, electromagnetic, infrared or semiconductor system, apparatus or device, or any proper combination thereof. More specific examples of the machine-readable storage medium may include an electrical connection based on one or more wires, a portable computer disk, a hard disk, a Random Access Memory (RAM), a Read-Only Memory (ROM), an Erasable Programmable ROM (EPROM) (or a flash memory), an optical fiber, a portable Compact Disc Read-Only Memory (CD-ROM), an optical storage device, a magnetic storage device, or any proper combination thereof.

In a first aspect, according to one or more embodiments of the present disclosure, there is provided an electronic device including a power supply apparatus, a processing apparatus, a conductive line, a measurement resistor, and voltage sensors, wherein: the power supply apparatus and the processing apparatus are connected through the conductive line; the measurement resistor is arranged on the processing apparatus and is connected in series with the processing apparatus and the power supply apparatus; the voltage sensors are arranged at both ends of the conductive line and at both ends of the measurement resistor for measuring voltage values at both ends of the conductive line, and voltage values at both ends of the measurement resistor, and transmitting the voltages to the processing apparatus.

According to one or more embodiments of the present disclosure, the conductive line includes a first conductive line and a second conductive line, wherein the first conductive line connects to a positive electrode of the power supply apparatus and a supply power voltage terminal of the processing apparatus, and the second conductive line connecting a negative electrode of the power supply apparatus and a ground terminal of the processing apparatus.

According to one or more embodiments of the present disclosure, the first conductive line connects the measurement resistor, the measurement resistor connected to the supply voltage terminal of the processing apparatus.

According to one or more embodiments of the present disclosure, the processing apparatus is further configured for, according to the voltage values at both ends of the conductive line, the voltage values at both ends of the measurement resistor, and a resistance value of the measurement resistor, determining a current value on the conductive line and a current resistance value of the conductive line, and according to the current value on the conductive line and the current resistance value of the conductive line, performing a compensation on a shutdown voltage value and/or a charging voltage value of the processing apparatus. In a second aspect, according to one or more embodiments of the present disclosure, a voltage compensation method is provided, applied to an electronic device as described in the first aspect and in various possible designs of the first aspect, and the voltage compensation method includes: determining voltage values at both ends of the conductive line, and a current value on the conductive line; determining a current resistance value of the conductive line according to the voltage values at both ends of the conductive line, and the current value; performing a compensation on a shutdown voltage value and/or a charging voltage value of the processing apparatus according to the current resistance value and the current value of the conductive line.

According to one or more embodiments of the present disclosure, the performing of the shutdown voltage value and/or the charging voltage value of the processing apparatus according to the current resistance value and the current value of the conductive line, includes: determining a voltage compensation value according to the current resistance value and the current value of the conductive line; in a discharging stage, determining, as a target shutdown voltage value of the processing apparatus, a result of subtracting the voltage compensation value from a preset shutdown voltage value of the power supply apparatus; and/or in a charging stage, determining, as a target charging voltage value of the processing apparatus, a result of adding the voltage compensation value to a preset charging voltage value of the power supply apparatus.

According to one or more embodiments of the present disclosure, the determining of the voltage compensation value according to the current resistance value and the current value of the conductive line, includes: determining, as the voltage compensation value, a product of the current resistance value and the current value of the conductive line.

According to one or more embodiments of the present disclosure, the conductive line includes a first conductive line and a second conductive line, and a current resistance value of the conductive line includes a current resistance value of the first conductive line and a current resistance value of the second conductive line, wherein the first conductive line connects a positive electrode of the power supply apparatus and a supply voltage terminal of the processing apparatus, and the second conductive line connects a negative electrode of the power supply apparatus and a grounding terminal of the processing apparatus.

According to one or more embodiments of the present disclosure, the determining voltage values at both ends of the conductive line, includes: collecting, by voltage sensors, voltage values at both ends of the first conductive line and voltage values at both ends of the second conductive line; the determining of a current resistance value of the conductive line according to the voltage values at both ends of the conductive line and the current value, includes: determining a current resistance value of the first conductive line according to the voltage values at both ends of the first conductive line and the current value; determining a current resistance value of the second conductive line according to the voltage values at both ends of the second conductive line and the current value.

According to one or more embodiments of the present disclosure, the determining of the current value on the conductive line, includes: collecting, by voltage sensors, voltage values at both ends of the measurement resistor; determining a current value on the conductive line according to the voltage values at both ends of the measurement resistor and the resistance value of the measurement resistor.

According to one or more embodiments of the present disclosure, the method further includes: measuring a current impedance of the power supply apparatus; determining a current open-circuit voltage value of the power supply apparatus in the discharging stage or the charging stage according to a voltage value of the processing apparatus side of the voltage values at both ends of the conductive line, a current resistance value of the conductive line, a current impedance of the power supply apparatus, and the current value; determining a remaining power corresponding to the current open-circuit voltage value from a preset open-circuit voltage-remaining power curve of the power supply apparatus, and determining the remaining power corresponding to the current open-circuit voltage value as a current power of the power supply apparatus.

According to one or more embodiments of the present disclosure, after determining of the remaining power corresponding to the current open-circuit voltage as the current power of the power supply apparatus, the present disclosure further includes: integrating the current value to obtain a power change value of the power supply apparatus in the discharging stage or in the charging stage; updating a current power of the power supply apparatus according to the power change value.

According to one or more embodiments of the present disclosure, the performing a compensation on a shutdown voltage value and/or a charging voltage value of the processing apparatus according to the current resistance value and the current value of the conductive line, includes: performing a compensation on a shutdown voltage and/or a charging voltage of the processing apparatus according to the current resistance value and the current value of the conductive line, in accordance with a determination that the current resistance value of the conductive line does not exceed a first preset threshold.

According to one or more embodiments of the present disclosure, the present disclosure further includes: outputting warning information in accordance with a determination that the current resistance value of the conductive line exceeds the first preset threshold; and/or limiting a charging and discharging current of the power supply apparatus and outputting maintenance prompting information, in accordance with a determination that the current resistance value of the conductive line exceeds a second preset threshold value, wherein the second preset threshold value is greater than the first preset threshold value; and/or in accordance with a determination that the current resistance value of the conductive line is a target multiple of an initial resistance value, determining the number of disconnected cables in the conductive line according to the target time, and outputting maintenance prompting information, wherein the maintenance prompting information includes the number of disconnected cables in the conductive line.

According to one or more embodiments of the present disclosure, the electronic device is a wearable electronic device.

In a third aspect, according to one or more embodiments of the present disclosure, a voltage compensation device is provided, including: a detection unit for determining voltage values at both ends of a conductive line, and a current value on the conductive line; a processing unit for determining a current resistance value of the conductive line according to the voltage values at both ends of the conductive line and the current value; a compensation unit for performing a compensation on a shutdown voltage value and/or a charging voltage value of the processing unit according to the current resistance value and the current value of the conductive line.

According to one or more embodiments of the present disclosure, the compensation unit, in performing the compensation on the shutdown voltage value and/or the charging voltage value of the processing apparatus, according to the current resistance value and the current value of the conductive line, is configured for: determining a voltage compensation value according to the current resistance value and the current value of the conductive line; in a discharging stage, determining, as a target shutdown voltage value of the processing apparatus, a result of subtracting the voltage compensation value from a preset shutdown voltage value of the power supply apparatus; and/or in a charging stage, determining, as a target charging voltage value of the processing apparatus, a result of adding the voltage compensation value to a preset charging voltage value of the power supply apparatus.

According to one or more embodiments of the present disclosure, the compensation unit, in determining the voltage compensation value according to the current resistance value and the current value of the conductive line, is configured for: determining, as the voltage compensation value, a product of the current resistance value and the current value of the conductive line.

According to one or more embodiments of the present disclosure, the conductive line includes a first conductive line and a second conductive line, and a current resistance value of the conductive line includes a current resistance value of the first conductive line and a current resistance value of the second conductive line, wherein the first conductive line connects a positive electrode of the power supply apparatus and a supply voltage terminal of the processing apparatus, and the second conductive line connects a negative electrode of the power supply apparatus and a grounding terminal.

According to one or more embodiments of the present disclosure, the detection unit, in determining the voltage values at both ends of the conductive line, is configured for: collecting, by voltage sensors, voltage values at both ends of the first conductive line and voltage values at both ends of the second conductive line; the processing unit, in determining the current resistance value of the conductive line according to the voltage values at both ends of the conductive line and the current value, is configured for: determining a current resistance value of the first conductive line according to the voltage values at both ends of the first conductive line and the current value; determining a current resistance value of the second conductive line according to the voltage values at both ends of the second conductive line and the current value.

According to one or more embodiments of the present disclosure, the detection unit, in determining the current value on the conductive line, is configured for: collecting, by voltage sensors, voltage values at both ends of the measurement resistor; determining the current value on the conductive line according to the voltage values at both ends of the measurement resistor and the resistance value of the measurement resistor.

According to one or more embodiments of the present disclosure, the detection unit is further configured for, measuring a current impedance of the power supply apparatus; the processing unit is further configured for, determining a current open-circuit voltage value of the power supply apparatus in the discharging stage or in the charging stage, according to a voltage value of the processing apparatus side of the voltage values at both ends of the conductive line, a current resistance value of the conductive line, a current impedance of the power supply apparatus, and the current value; the device further includes a power determination unit configured for determining a remaining power corresponding to the current open-circuit voltage value from a preset open-circuit voltage-remaining power curve of the power supply apparatus, and determining the remaining power corresponding to the current open-circuit voltage value as a current power of the power supply apparatus.

According to one or more embodiments of the present disclosure, the power determination unit, after determining of the remaining power corresponding to the current open-circuit voltage value as a current power of the power supply apparatus, is further configured for: integrating the current value to obtain a power change value of the power supply apparatus in the discharging stage or the charging stage; updating the current power of the power supply apparatus according to the power change value.

According to one or more embodiments of the present disclosure, the device further includes a conductive line resistance monitor unit, and in a case where the conductive line resistance monitor unit determines that the current resistance value of the conductive line does not exceed the first preset threshold value, the compensation unit performs a compensation on the shutdown voltage and/or the charging voltage of the processing apparatus according to the current resistance value and the current value of the conductive line.

According to one or more embodiments of the present disclosure, the conductive line resistance monitor unit is further configured for: outputting warning information, in accordance with a determination that the current resistance value of the conductive line exceeds the first preset threshold; and/or limiting a charging and discharging current of the power supply apparatus and outputting maintenance prompting information, in accordance with a determination that the current resistance value of the conductive line exceeds a second preset threshold value, wherein the second preset threshold value is greater than the first preset threshold value; and/or in accordance with a determination that the current resistance value of the conductive line is a target multiple of an initial resistance value, determining the number of disconnected cables in the conductive line according to the target multiple, and outputting maintenance prompting information, wherein the maintenance prompting information includes the number of disconnected cables in the conductive line.

According to one or more embodiments of the present disclosure, the electronic device is a wearable electronic device.

In a fourth aspect, according to one or more embodiments of the present disclosure, a processing apparatus is provided, including: at least one processor and a memory, wherein: the memory stores computer-executable instructions; and the at least one processor executes the computer-executable instructions stored on the memory, such that the at least one processor performs the voltage compensation methods as described above in the second aspect and in various possible designs of the second aspect.

In a fifth aspect, according to one or more embodiments of the present disclosure, a computer-readable storage medium is provided, wherein the computer-readable storage medium has computer-executable instructions stored thereon which, when executed by a processor, implement the voltage compensation methods as described above in the second aspect and in various possible designs of the second aspect.

In a sixth aspect, according to one or more embodiments of the present disclosure, a computer program product is provided, wherein the computer program product includes computer-executable instructions which, when executed by a processor, implement the voltage compensation methods as described in the second aspect above and in various possible designs of the second aspect.

The above description is only the description of the preferred embodiments of the present disclosure and the technical principles used thereof. Those skilled in the art should know that the scope of disclosure involved in the embodiments of the present disclosure is not limited to the technical solutions formed by specifically combining the above-mentioned technical features and shall cover other technical solutions formed by freely combining the above-mentioned technical features or equivalent features thereof without departing from the concept of the present disclosure, for example, technical solutions formed by interchanging the above-mentioned features and (but not limited to) the technical features with similar functions disclosed in the embodiments of the present disclosure.

In addition, although operations are described in a specific order, it should not be explained that these operations are required to be executed in the shown specific order or in sequence. In a certain environment, multi-task and concurrent-processing may be favorable. Likewise, a plurality of specific implementation details are included in the above discussion, but they should not be explained as limits to the scope of the present disclosure. Certain features described in the context of a single embodiment may be implemented in multiple embodiments independently or in form of any proper sub-combination. On the contrary, various described in the context of a single implementation may be implemented in a plurality of implementations independently or in form of any proper sub-combination.

Although the subject matter has been described with a language specific to the structural features and/or logic operations in the method, it should be understood that the subject matter defined in the appended claims is not limited to the above-described specific features or operations. On the contrary, the above-described specific features and steps are only example forms for implementing the claims.

The invention claimed is:

1. An electronic device, including a power supply apparatus, a processing apparatus, a conductive line, a measurement resistor, and voltage sensors, wherein:

the power supply apparatus and the processing apparatus are connected through the conductive line;

the measurement resistor is arranged on the processing apparatus and is connected in series with the processing apparatus and the power supply apparatus;

the voltage sensors are arranged at both ends of the conductive line and at both ends of the measurement resistor, for measuring voltage values at both ends of the conductive line, and voltage values at both ends of the measurement resistor, and transmitting the voltage values to the processing apparatus;

the processing apparatus is further configured to, according to the voltage values at both ends of the conductive line, the voltage values at both ends of the measurement resistor, and a resistance value of the measurement resistor, determine a current value on the conductive line and a current resistance value of the conductive line, and perform a compensation on at least one of a shutdown voltage value or a charging voltage value of the processing apparatus according to the current value on the conductive line and the current resistance value of the conductive line; and the processing apparatus is a wearable electronic device, and the power supply apparatus is separate from the processing apparatus.

2. The electronic device according to claim 1, wherein:

the conductive line includes a first conductive line and a second conductive line, wherein the first conductive line connects a positive electrode of the power supply apparatus and a supply power voltage terminal of the processing apparatus, and the second conductive line connects a negative electrode of the power supply apparatus and a grounding terminal of the processing apparatus.

3. The electronic device according to claim 2, wherein the first conductive line is connected to the measurement resistor, and the measurement resistor is connected to the supply power voltage terminal of the processing apparatus.

4. A voltage compensation method, applied to the electronic device according to claim 1, the method including:

determining the voltage values at both ends of the conductive line, and the current value on the conductive line;

determining the current resistance value of the conductive line according to the voltage values at both ends of the conductive line and the current value; and performing the compensation on at least one of the shutdown voltage value or the charging voltage value of the processing apparatus according to the current resistance value and the current value of the conductive line.

5. The method according to claim 4, wherein the performing of a compensation on at least one of the shutdown voltage value or the charging voltage value of the processing apparatus according to the current resistance value and the current value of the conductive line includes:

determining a voltage compensation value according to the current resistance value and the current value of the conductive line; and at least one of:

in a discharging stage, determining, as a target shutdown voltage value of the processing apparatus, a result of subtracting the voltage compensation value from a preset shutdown voltage value of the power supply apparatus; or in a charging stage, determining, as a target charging voltage value of the processing apparatus, a result of adding the voltage compensation value to a preset charging voltage value of the power supply apparatus.

6. The method according to claim 5, wherein the determining of the voltage compensation value according to the current resistance value and the current value of the conductive line includes:

determining, as the voltage compensation value, a product of the current resistance value and the current value of the conductive line.

7. The method according to claim 4, wherein the conductive line includes a first conductive line and a second conductive line, and the current resistance value of the conductive line includes a current resistance value of the first conductive line and a current resistance value of the second conductive line, wherein the first conductive line connects a positive electrode of the power supply apparatus and a supply power voltage terminal of the processing apparatus, and the second conductive line connects a negative electrode of the power supply apparatus and a grounding terminal of the processing apparatus.

8. The method according to claim 7, wherein the determining of the voltage values at both ends of the conductive line includes:

collecting, by voltage sensors, voltage values at both ends of the first conductive line and voltage values at both ends of the second conductive line; and the determining of the current resistance value of the conductive line according to the voltage values at both ends of the conductive line and the current value includes:

determining the current resistance value of the first conductive line according to the voltage values at both ends of the first conductive line and the current value; and determining the current resistance value of the second conductive line according to the voltage values at both ends of the second conductive line and the current value.

9. The method according to claim 4, wherein the determining of the current value on the conductive line includes:

collecting, by voltage sensors, voltage values at both ends of the measurement resistor; and determining the current value on the conductive line according to the voltage values at both ends of the measurement resistor and a resistance value of the measurement resistor.

10. The method according to claim 4, the method further including:

measuring a current impedance of a power supply apparatus;

determining a current open-circuit voltage value of the power supply apparatus in a discharging stage or in a charging stage, according to a voltage value of the processing apparatus side of the voltage values at both ends of the conductive line, the current resistance value of the conductive line, a current impedance of the power supply apparatus, and the current value; and determining a remaining power corresponding to the current open-circuit voltage value from a preset open-circuit voltage-remaining power curve of the power supply apparatus, and determining the remaining power corresponding to the current open-circuit voltage value as a current power of the power supply apparatus.

11. The method according to claim 10, wherein the determining of the remaining power corresponding to the current open-circuit voltage value as a current power of the power supply apparatus further includes:

integrating the current value to obtain a power change value of the power supply apparatus in the discharging stage or the charging stage; and updating the current power of the power supply apparatus according to the power change value.

12. The method according to claim 7, wherein the performing of the compensation on at least one of the shutdown voltage value or the charging voltage value of the processing apparatus according to the current resistance value and the current value of the conductive line includes:

performing the compensation on at least one of the shutdown voltage or the charging voltage of the processing apparatus according to the current resistance value and the current value of the conductive line, in accordance with a determination that the current resistance value of the conductive line does not exceed a first preset threshold.

13. The method according to claim 12, the method further including at least one of:

outputting warning information, in accordance with a determination that the current resistance value of the conductive line exceeds the first preset threshold;

limiting a charging and discharging current of the power supply apparatus and outputting maintenance prompting information, in accordance with a determination that the current resistance value of the conductive line exceeds a second preset threshold value, wherein the second preset threshold value is greater than the first preset threshold value; or in accordance with a determination that the current resistance value of the conductive line is a target multiple of an initial resistance value, determining the number of disconnected cables in the conductive line according to the target multiple, and outputting maintenance prompting information, wherein the maintenance prompting information includes the number of disconnected cables in the conductive line.

14. A processing apparatus, including at least one processor and a memory, the memory storing computer-executable instructions; and the at least one processor executing the computer-executable instructions stored on the memory such that the at least one processor performs the operations including:

determining voltage values at both ends of a conductive line connecting a power supply apparatus and the processing apparatus, and a current value on the conductive line;

determining a current resistance value of the conductive line according to the voltage values at both ends of the conductive line and the current value; and performing a compensation on at least one of a shutdown voltage value or a charging voltage value of the processing apparatus according to the current resistance value and the current value of the conductive line;

wherein the performing the compensation on at least one of the shutdown voltage value or the charging voltage value of the processing apparatus according to the current resistance value and the current value of the conductive line includes:

determining a voltage compensation value according to the current resistance value and the current value of the conductive line; and at least one of:

in a discharging stage, determining, as a target shutdown voltage value of the processing apparatus, a result of subtracting the voltage compensation value from a preset shutdown voltage value of the power supply apparatus; or in a charging stage, determining, as a target charging voltage value of the processing apparatus, a result of adding the voltage compensation value to a preset charging voltage value of the power supply apparatus.

15. The processing apparatus according to claim 14, wherein the determining of the voltage compensation value according to the current resistance value and the current value of the conductive line includes:

determining, as the voltage compensation value, a product of the current resistance value and the current value of the conductive line.

16. The processing apparatus according to claim 14, wherein the conductive line includes a first conductive line and a second conductive line, and the current resistance value of the conductive line includes a current resistance value of the first conductive line and a current resistance value of the second conductive line, wherein the first conductive line connects a positive electrode of the power supply apparatus and a supply power voltage terminal of the processing apparatus, and the second conductive line connects a negative electrode of the power supply apparatus and a grounding terminal of the processing apparatus.

17. The processing apparatus according to claim 16, wherein the determining of the voltage values at both ends of the conductive line includes:

collecting, by voltage sensors, voltage values at both ends of the first conductive line and voltage values at both ends of the second conductive line; and the determining of the current resistance value of the conductive line according to the voltage values at both ends of the conductive line and the current value includes:

determining the current resistance value of the first conductive line according to the voltage values at both ends of the first conductive line and the current value; and determining the current resistance value of the second conductive line according to the voltage values at both ends of the second conductive line and the current value.

* * * * *